US 8,041,678 B2

(12) United States Patent
Kol et al.

(10) Patent No.: US 8,041,678 B2
(45) Date of Patent: Oct. 18, 2011

(54) INTEGRATED DATA AVAILABILITY AND HISTORICAL DATA PROTECTION

(75) Inventors: Ayla Kol, Sammamish, WA (US); Rebecca Carolyn Benfield, Seattle, WA (US); Georgia Ann Huggins, Redmond, WA (US); Greg Irving Thiel, Black Diamond, WA (US); Alexander Robert Norton Wetmore, Seattle, WA (US); Mark Sheldon Wistrom, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 445 days.

(21) Appl. No.: 12/143,735

(22) Filed: Jun. 20, 2008

(65) Prior Publication Data

US 2009/0319583 A1    Dec. 24, 2009

(51) Int. Cl.
*G06F 17/30* (2006.01)
*G06F 7/00* (2006.01)
(52) U.S. Cl. ......... 707/640; 707/649; 707/670; 711/162
(58) Field of Classification Search .......... 707/640–686; 714/6; 711/162
See application file for complete search history.

(56) References Cited

U.S. PATENT DOCUMENTS

| 6,631,478 | B1 | 10/2003 | Wang et al. |
| 7,000,143 | B2 | 2/2006 | Moulton et al. |
| 7,343,453 | B2 | 3/2008 | Prahlad et al. |
| 7,568,124 | B2 * | 7/2009 | Ali et al. ............................ 714/6 |
| 7,698,318 | B2 * | 4/2010 | Fries et al. .................... 707/610 |
| 2004/0078508 | A1 | 4/2004 | Rivard |
| 2005/0273650 | A1 | 12/2005 | Tsou |
| 2006/0282697 | A1 | 12/2006 | Sim-Tang |
| 2007/0174580 | A1 | 7/2007 | Shulga |
| 2007/0195692 | A1 | 8/2007 | Hagglund et al. |

FOREIGN PATENT DOCUMENTS

WO    W02007002397 A2    1/2007

OTHER PUBLICATIONS

"BakBone Announces NetVault: Backup 8.0 with Integrated, Cross-platform Continuous Data Protection", Business Wire, Oct. 1, 2007, pp. 1-6.
"IBM Data Continuity Services for Backup and Recovery—Electronic Data Management", IBM Corporation, 2006, pp. 1-4.
"Symantec Advocates Data Deduplication as Part of an Overall Backup Strategy", May 1, 2007, Symantec Corporation, pp. 2.

* cited by examiner

*Primary Examiner* — Yicun Wu
(74) *Attorney, Agent, or Firm* — Capitol City TechLaw; Richard C. Irving

(57) ABSTRACT

A single native integrated system may be provided for replicating data to one or more copies of high-availability data and for replicating the data to one or more copies of backup data. The data may be replicated, in near real-time, to the one or more copies of high-availability data as changes occur to the data. The data may be replicated and later incorporated to a copy of the backup data at different points in time. The single native integrated system may have a single set of functions for replicating the data to the one or more copies of high-availability data and for replicating the data for the one or more copies of the backup data. Administrative access to the one or more copies of high-availability data may be isolated from administrative access to the one or more copies of the backup data.

20 Claims, 4 Drawing Sheets

300

```
ENTER ADDRESS OF PROCESSING DEVICE HAVING ASSOCIATED      ⎫ 302
PRODUCTION DATABASE _____                        ⎭

ENTER ADDRESS OF PROCESSING DEVICE HAVING ASSOCIATED      ⎫ 304
HIGH AVAILABILITY COPY OF PRODUCTION DATABASE              ⎭
_____

ENTER ADDRESS OF PROCESSING DEVICE HAVING ASSOCIATED      ⎫ 306
BACKUP COPIES OF PRODUCTION DATABASE _____       ⎭

ENTER TIME INTERVAL FOR MAKING BACKUP COPIES OF           ⎫ 308
PRODUCTION DATABASE _____                        ⎭

ENTER GROUP ID OF GROUP ADMINISTERING HIGH AVAILABILITY   ⎫ 310
COPY OF PRODUCTION DATABASE _____                ⎭

ENTER GROUP ID OF GROUP ADMINISTERING BACKUP COPIES       ⎫ 314
OF PRODUCTION DATABASE _____                     ⎭
```

FIG. 3

INTEGRATED DATA AVAILABILITY AND HISTORICAL DATA PROTECTION

BACKGROUND

Existing database, e-mail and enterprise content management systems may provide support for high-availability data, such as, for example, data for automatic teller machine (ATM) networks, data for online stores and e-commerce applications, and data for continuously available systems, such as, for example e-mail and document management systems.

Systems, which rely on high-availability data, provide near continuous access to a current version of the high-availability data. Users of such systems may purchase, deploy, and manage separate systems, which may provide a different management experience, for maintaining previous versions of the data, such as, for example, historical, or backup data. The backup data may be kept for a variety of reasons, such as, for example, business continuity, logical error recovery, major software failures, malicious mischief (for example, a rogue administrator), and historical document retention, as well as other reasons.

SUMMARY

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

In embodiments consistent with the subject matter of this disclosure, a single integrated system may provide a single set of functionality and a single management experience for maintaining one or more high-availability copies of data when changes occur to the high-availability data, in near real-time, and for protecting historical data by replicating, and later incorporating, different versions of the data to one or more backup copies of the data at different points in time.

In various embodiments, one type of replication technology may be used in the single integrated system to replicate the data for one or more high-availability copies and to replicate the data to one or more backup copies of the data. The single integrated system may be a native integrated system for replicating data to a high-availability copy of the data and for replicating the data for backup, or historical protection, purposes.

DRAWINGS

In order to describe the manner in which the above-recited and other advantages and features can be obtained, a more particular description is described below and will be rendered by reference to specific embodiments thereof which are illustrated in the appended drawings. Understanding that these drawings depict only typical embodiments and are not therefore to be considered to be limiting of its scope, implementations will be described and explained with additional specificity and detail through the use of the accompanying drawings.

FIG. 3 is an exemplary display, which illustrates an exemplary management experience in an embodiment consistent with the subject matter of this disclosure.

DETAILED DESCRIPTION

Embodiments are discussed in detail below. While specific implementations are discussed, it is to be understood that this is done for illustration purposes only. A person skilled in the relevant art will recognize that other components and configurations may be used without parting from the spirit and scope of the subject matter of this disclosure.

Overview

Embodiments consistent with the subject matter of this disclosure may provide a single integrated system for maintaining one or more high-availability copies of data by replicating the high-availability data when changes occur to the high-availability data in near real-time and for protecting historical data by replicating the data to a backup copy of the data at different points in time, thereby creating backup copies of different versions of the data.

The single integrated system may use a same replication technology for replicating high-availability data and replicating the data for backup copies of the data. The single integrated system may provide a single management experience with respect to replicating the high-availability data and replicating the data for the backup copies of the data. In some embodiments, the system may include multiple processing devices, each having associated high-availability data, an associated copy of the high-availability data, and/or backup data. Further, each of the processing devices may communicate with others of the processing devices via a network.

Embodiments of the single integrated system may include a native integrated system for maintaining high-availability data by replicating the high-availability data, and for replicating data for backup, or historical, purposes. The single integrated system may further include a single set of functions for maintaining high-availability copies of the high-availability data and for replicating the high-availability data for historical data protection purposes.

Exemplary Operating Environment

Figure 1:
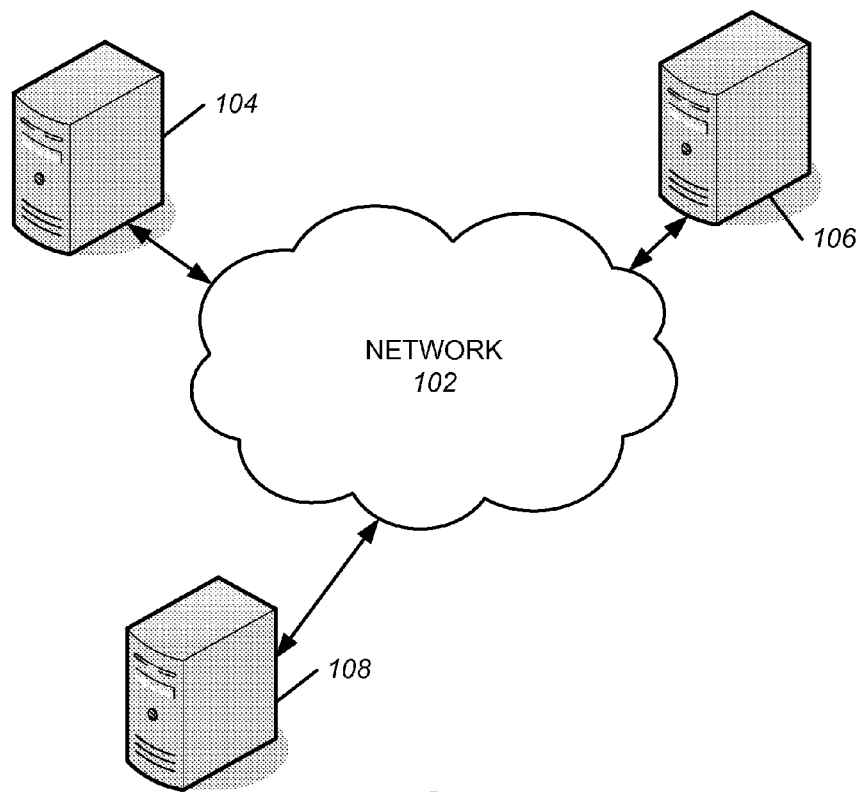
FIG. 1 illustrates an exemplary operating environment for embodiments consistent with the subject matter of this disclosure.

FIG. 1 illustrates an exemplary operating environment for embodiments consistent with the subject matter of this disclosure. The exemplary operating environment may include a network 102 and processing devices 104, 106, 108 connected to network 102.

Network 102 may be a single network or a combination of networks, such as, for example, the Internet, or other networks. Network 102 may include a wireless network, a wired network, a packet-switching network, a public-switched telecommunications network, a fiber-optic network, other types of networks, or any combination of the above.

Processing devices 104, 106, 108 may be desktop personal computers (PCs), notebook PCs, servers, server farms, or other types of processing devices associated with high-availability data, a copy of the high-availability data, or a backup copy of the high-availability data. Processing devices 104, 106, 108 may communicate with one another via network 102.

The operating environment of FIG. 1 is only exemplary. Other operating environments may have more or fewer processing devices associated with high-availability data, a copy of the high-availability data, or a backup copy of the high-availability data and/or more networks.

Exemplary Processing Device

Figure 2:
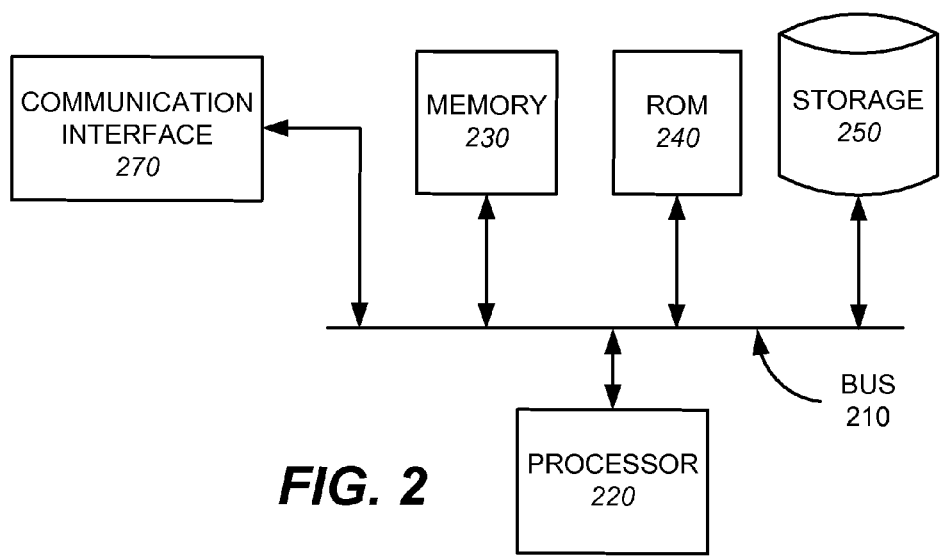
FIG. 2 illustrates a functional block diagram of an exemplary processing device, which may be used to implement embodiments consistent with the subject matter of this disclosure.

FIG. 2 is a functional block diagram of an exemplary processing device 200, which may be used to implement processing devices, such as, processing devices 104, 106, 108 in embodiments consistent with the subject matter of this disclosure. Processing device 200 may be a desktop personal computer (PC), a notebook PC, a server, a server farm, or other processing device. Processing device 200 may include a bus 210, a memory 230, a read only memory (ROM) 240, a communication interface 270, a processor 220, and a storage device 250. Bus 210 may permit communication among components of processing device 200.

Processor 220 may include at least one conventional processor or microprocessor that interprets and executes instructions. Memory 230 may be a random access memory (RAM) or another type of dynamic storage device that stores information and instructions for execution by processor 220. Memory 130 may also store temporary variables or other intermediate information used during execution of instructions by processor 220. ROM 240 may include a conventional ROM device or another type of static storage device that stores static information and instructions for processor 220. Storage device 250 may include a hard disc and corresponding drive, or other type of storage device for storing data, such as, for example, high-availability data, a copy of high-availability data, or a database and/or instructions for processor 220. Communication interface 270 may permit processing device 200 to communicate via a network wirelessly, or through a cable.

Processing device 200 may perform functions in response to processor 220 executing sequences of instructions contained in a tangible machine-readable medium, such as, for example, memory 230, ROM 240, storage device 250 or other media. Such instructions may be read into memory 230 from another machine-readable medium or from a separate device via communication interface 270.

Exemplary Management Experience

FIG. 3 is an exemplary display 300 illustrating an example of a management experience of an embodiment of a single integrated system consistent with the subject matter of this disclosure. A system administrator may enter a network address of a processing device having an associated production database 302. The system administrator may further enter a network address of a processing device having an associated high-availability copy of the production database 304. The system administrator may further enter a network address of a processing device having associated backup copies of the production database 306. The system administrator may also enter a time interval for periodically making backup copies of the production database 308.

When configuring the system, a group ID of a group of administrators responsible for administering a high-availability production database and one or more high-availability copies of the production database may be entered 310. Similarly, a group ID of a group of administrators responsible for administering one or more backup, or historical, copies of the production database may be entered 314.

One security problem, which may occur in systems for maintaining a high-availability copy of a database and backup, or historical, copies of a database is called a rogue administrator problem. As an example of the rogue administrator problem, an administrator responsible for maintaining the high-availability copy of the database and the backup, or historical, copies of the database may maliciously make changes to, or destroy, both the high-availability copy of the database and the backup copy (or copies) of the database, thereby making restoration of the database difficult, if not impossible. To avoid the rogue administrator problem, as well as other security problems, only the group of administrators responsible for administering the one or more high-availability copies of the database may have administrative access to the one or more high-availability copies of the database, and only the group of administrators responsible for administering the backup copies of the database may have administrative access to the backup copies of the database. The two groups of administrators may be completely different from one another. Thus, administrative access to the one or more high-availability copies of the database may be isolated from administrative access to the one or more backup copies of the database.

Although exemplary display 300 refers to a database and copies of the database, in other embodiments, the data may not be included in databases. For example, instead of having a database, the system may have production data. Similarly, instead of having a high-availability copy of the database and backup copies of the database, the system may have a high-availability copy of the production data and backup copies of the production data.

Exemplary Processing

Figure 4:
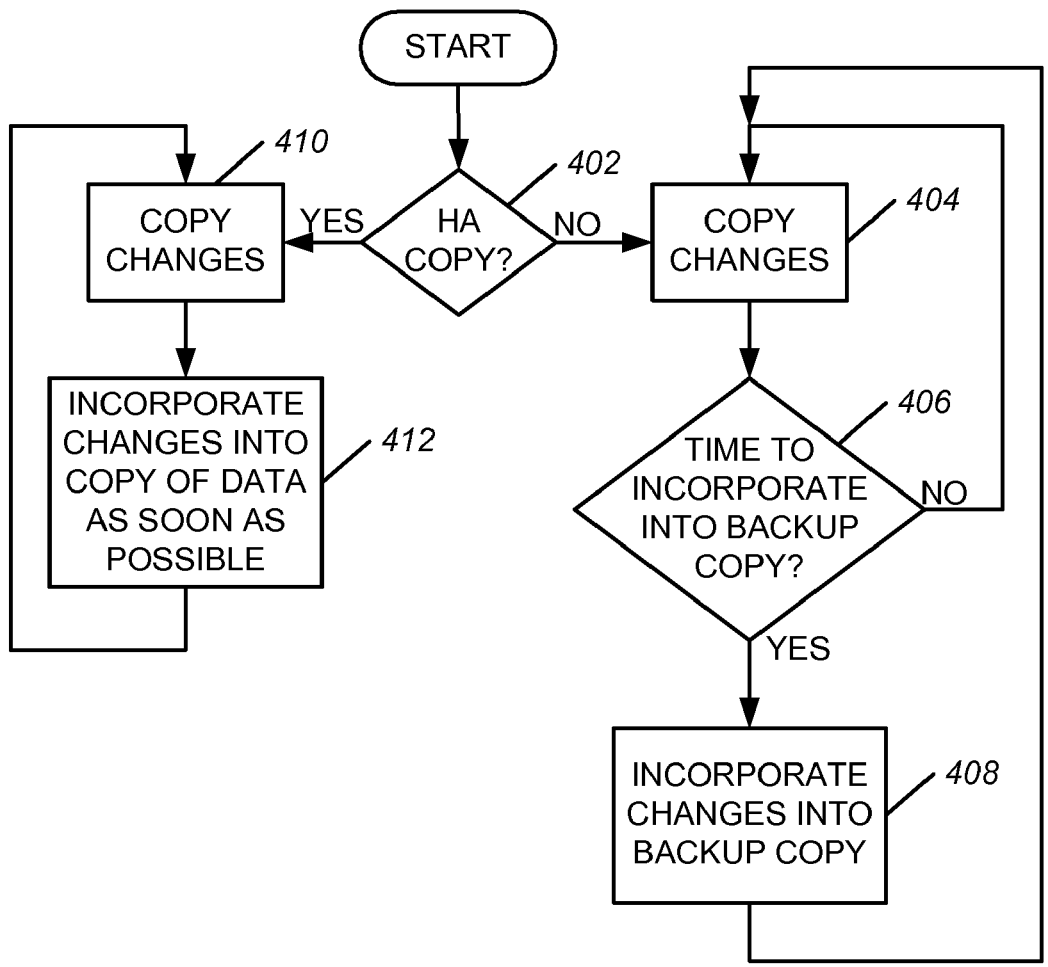
FIG. 4 is a flowchart explaining an exemplary process, which may be performed in embodiments of an integrated system consistent with the subject matter of this disclosure.

FIG. 4 is a flowchart illustrating an exemplary process, which may be performed by a processing device consistent with the subject matter described in this disclosure. The process may begin with the processing device determining if the processing device is maintaining a high availability copy of production data (act 402). The production data may be data included in a database, an e-mail system, an enterprise content management system, or other system for maintaining high-availability production data. The data may include, for example, data for an automated teller machine (ATM) network, data for supporting online stores and e-commerce applications, data for a continuously available e-mail system, data included in a document management system, or data for other continuously available applications.

If the processing device determines that the processing device is not maintaining a high availability copy of the production data, then the processing device may assume that the processing device is maintaining one or more backup copies of the production data and the processing device may copy information with respect to changes made to the production data (act 404). The processing device may then determine whether changes are to be incorporated now into one of the one or more backup copies of the production data (act 406). In some embodiments, the processing device may determine whether the changes are now to be incorporated into one of the one or more backup copies of the production data by checking a historical, or backup, data protection configuration, which may include a lag time, or a backup schedule. When the processing device determines that the changes are to be incorporated now into one of the one or more backup copies of the production data, the processing device may incorporate the changes into the one of the one or more backup copies of the production data (act 408). Acts 404-408 may then be repeated.

If the processing device determines, during act 402, that the processing device is maintaining a high availability copy of the production data, then the processing device may copy information regarding changes made to the production data (act 410). The processing device may then incorporate the changes to the production data into the high availability copy of the production data as soon as possible (act 412). Acts 410-412 may then be repeated.

In some embodiments, a processing device may be responsible for maintaining both a high availability copy of the production data and a backup copy of the production data. In such embodiments, a process, such as the process illustrated by FIG. 4, may be called to either copy changes for a high availability copy of the production data or copy changes for a backup copy of the production data. Whether the process is called with respect to the high availability copy or the backup copy may be indicated by a parameter, which may be set by a calling process, or other process.

Further, in some embodiments, the production data, the high availability data, and the backup copy of the production data may be stored in respective databases.

Figure 5:
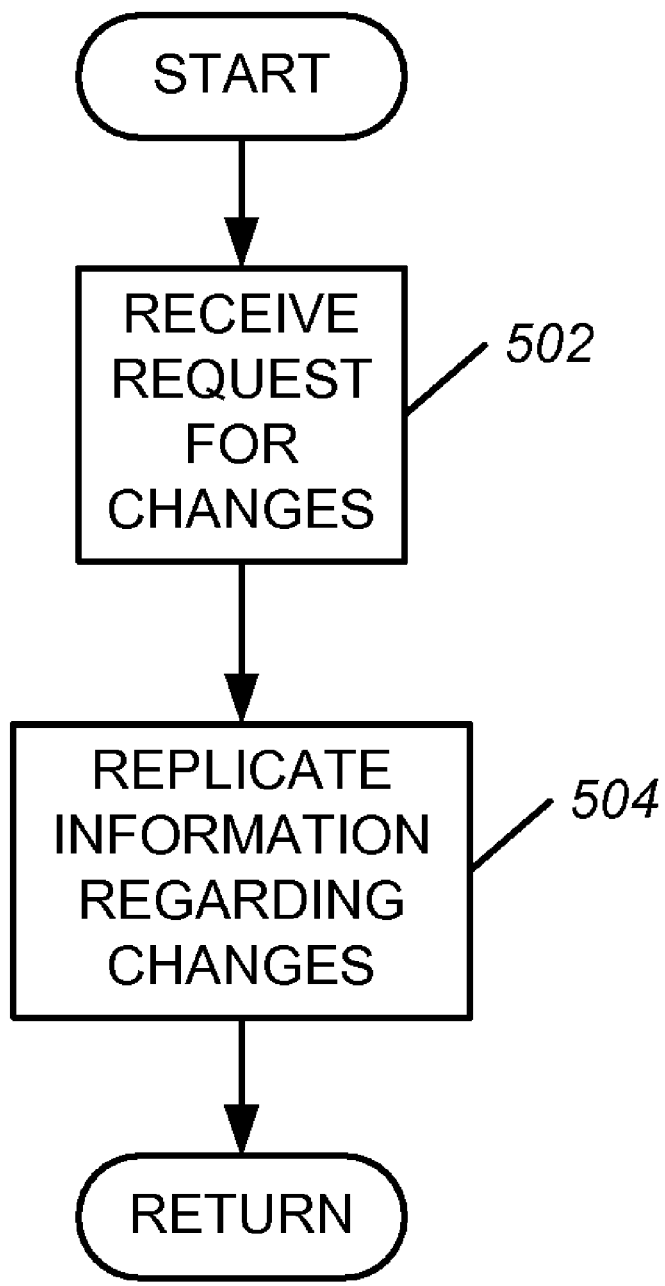
FIG. 5 is a flowchart explaining the exemplary process of FIG. 4 from a point of view of a processing device associated with data to be replicated.

FIG. 5 is a flowchart illustrating an exemplary process with respect to a processing device associated with a production database. The process may begin with the processing device receiving a request for information regarding changes to the production data (act 502). For example, a second processing device may request information with respect to changes to the production data for maintaining a high availability copy of the data or a backup copy of the production data.

The processing device may then replicate information to the second processing device regarding the changes to the production data (act 504).

CONCLUSION

Although the subject matter has been described in language specific to structural features and/or methodological acts, it is to be understood that the subject matter in the appended claims is not necessarily limited to the specific features or acts described above. Rather, the specific features and acts described above are disclosed as example forms for implementing the claims.

Although the above descriptions may contain specific details, they are not be construed as limiting the claims in any way. Other configurations of the described embodiments are part of the scope of this disclosure. Further, implementations consistent with the subject matter of this disclosure may have more or fewer acts than as described with respect to FIG. 4, or may implement acts in a different order than as shown. Accordingly, the appended claims and their legal equivalents define the invention, rather than any specific examples given.

We claim as our invention:

1. A machine-implemented method for providing integrated data availability and historical data protection, the machine-implemented method comprising:

maintaining, with a single integrated system, at least one high-availability copy of high-availability data by incorporating, into the at least one high-availability copy of the high-availability data, changes made to the high-availability data in near real-time;

replicating, with the single integrated system, the high-availability data to produce multiple backup copies of the high-availability data, each of the multiple backup copies of the high-availability data being a copy of the high-availability data as the high-availability data existed at a respective point in time, the single integrated system being a native system for the maintaining and the replicating;

configuring, via the single integrated system, a first group of administrators to have administrative access to the at least one high-availability copy of the high-availability data, and a second group of administrators to have administrative access to the multiple backup copies of the high-availability data, the first group of administrators and the second group of administrators having no administrators in common;

permitting the administrative access to the at least one high-availability copy of the high-availability data only to administrators of the first group of administrators, as a result of the configuring; and permitting the administrative access to the multiple backup copies of the high-availability data only to administrators of the second group of administrators, as a result of the configuring.

2. The machine-implemented method of claim 1, wherein the maintaining of the at least one high-availability copy of the high-availability data further comprises:

incorporating, into the at least one high-availability copy of the high availability data, changes made to a production version of the high-availability data as soon as possible.

3. The machine-implemented method of claim 1, wherein:

the maintaining of the at least one high-availability copy of the high-availability data and the replicating of the high-availability data to produce multiple backup copies of the high-availability data are performed using a same replication technology.

4. The machine-implemented method of claim 1, wherein:

the high-availability data is included in a first database, the first database being a production database, the at least one high-availability copy of the high-availability data is included in at least one copy of the first database, and the replicated multiple backup copies of the high-availability data are included in multiple backup copies of the database as the database existed at the respective points in time.

5. The machine-implemented method of claim 1, wherein the replicating of the high-availability data to produce multiple backup copies of the high-availability data further comprises:

incorporating the high-availability data into ones of the multiple backup copies at different points in time according to a configured backup schedule or a configured lag time.

6. The machine-implemented method of claim 1, wherein the single integrated system includes a single set of functions for maintaining high-availability copies of the high-availability data and for replicating the high-availability data for historical data protection.

7. The machine-implemented method of claim 1, further comprising:

providing, by the single integrated system, a single management experience with respect to the maintaining the at least one high-availability copy of the high-availability data and the replicating of the high-availability data to produce the multiple backup copies of the high-availability data.

8. A single integrated system for providing high data availability and historical data protection, the single integrated system comprising:

a plurality of processing devices connected to a network and communicating with at least one other of the plurality of processing devices;

at least one processor included in each of the plurality of processing devices;

a respective memory included in each of the plurality of processing devices, each one of the respective memories being connected to the at least one processor included in respective ones of the plurality of processing devices, the respective memories further comprise:

instructions for replicating changes made to high-availability data for at least one high-availability copy of the high-availability data, the replicating occurring as close as possible in time with respect to each of the changes made to the high-availability data, instructions for replicating the high-availability data for a backup copy of the high-availability data, instructions for permitting only administrators of a first group of administrators to have administrative access to the at least one high-availability copy of the high-availability data, and instructions for permitting only administrators of a second group of administrators to have administrative access to the backup copy of the high-availability data, wherein the first group of administrators and the second group of administrators have no administrators in common.

9. The single integrated system of claim 8, wherein the instructions for replicating changes made to high-availability data for at least one high-availability copy of the high-availability data and the instructions for replicating the high-availability data for a backup copy of the high-availability data use a same replicating technology.

10. The single integrated system of claim 8, wherein the instructions for replicating the high-availability data to a backup copy of the high-availability data further comprise:

instructions for incorporating the high-availability data to multiple backup copies of the high-availability data at multiple points in time.

11. The single integrated system of claim 8, wherein the respective memories further comprise:

instructions for providing a single set of functions for replicating the changes made to the high-availability data for the at least one high-availability copy of the high-availability data and for replicating the high-availability data for the backup copy of the high-availability data.

12. The single integrated system of claim 8, wherein:

the high-availability data is included in a first database, and the at least one high-availability copy of the high-availability data is included in a second database which is a copy of the first database.

13. The single integrated system of claim 8, wherein the respective memories further comprise instructions for providing a single management experience for configuring replication of the changes made to the high-availability data for the at least one high-availability copy of the high-availability data and for configuring replication of the high-availability data for the backup copy of the high-availability data.

14. The single integrated system of claim 8, wherein the respective memories further comprise:

instructions for permitting configuring of a replication of the high-availability data for the at least one high-availability copy of the high-availability data and for configuring a replication of the high-availability data for the backup copy of the high-availability data via a single display screen of a user interface.

15. A tangible machine-readable medium having instructions recorded thereon for at least one processor of a single integrated system, the instructions comprising:

instructions for replicating, by the single integrated system, changes are made to high-availability production data for a high-availability copy of the high-availability production data, the replicating occurring as close in time as possible to each of the changes made to the high-availability production data;

instructions for incorporating, by the single integrated system, changed high-availability production data to a respective backup copy of the production data at multiple points in time;

instructions for permitting only administrators of a first group of administrators to have administrative access to the high-availability copy of the high-availability production data; and instructions for permitting only administrators of a second group of administrators to have administrative access to the respective backup copies of the high-availability production data, wherein the first group of administrators and the second group of administrators have no administrators in common.

16. The tangible machine-readable medium of claim 15, wherein the instructions further comprise:

instructions for keeping administrative access to the high-availability copy of the high-availability production data isolated from administrative access to the respective backup copies of the high-availability production data.

17. The tangible machine-readable medium of claim 15, wherein the instructions further comprise:

instructions for providing a single set of functions for replicating the changes made to the high-availability production data for the high-availability copy of the high-availability production data and for replicating the high-availability production data for the respective backup copy of the production data.

18. The tangible machine-readable medium of claim 15, wherein:

the high-availability production data is included in a database, the high-availability copy of the high-availability production data is included in a high-availability copy of the database, and the respective backup copies are included in multiple copies of the database.

19. The tangible machine-readable medium of claim 18, wherein each of the multiple copies of the database includes a copy of the database as the database existed at a respective point in time.

20. The tangible machine-readable medium of claim 15, wherein the instructions further comprise:

instructions for using a same replication technology for replicating the changes made to the high-availability production data to the high-availability copy of the high-availability production data and for replicating the high-availability production data to the respective backup copies of the high-availability production data.

* * * * *

UNITED STATES PATENT AND TRADEMARK OFFICE
CERTIFICATE OF CORRECTION

| | | |
|---|---|---|
| PATENT NO. | : 8,041,678 B2 | Page 1 of 1 |
| APPLICATION NO. | : 12/143735 | |
| DATED | : October 18, 2011 | |
| INVENTOR(S) | : Ayla Kol et al. | |

It is certified that error appears in the above-identified patent and that said Letters Patent is hereby corrected as shown below:

In column 8, line 8, In Claim 15, after "changes" delete "are".

Signed and Sealed this
Sixth Day of December, 2011

David J. Kappos
*Director of the United States Patent and Trademark Office*